United States Patent [19]

Lee et al.

[11] Patent Number: 5,734,636
[45] Date of Patent: Mar. 31, 1998

[54] SONG RECORDING MEDIUM FOR VIDEO-SONG ACCOMPANIMENT AND A RECORDING AND REPRODUCING METHOD AND REPRODUCING APPARATUS ADOPTING THE SAME

[75] Inventors: Deok-hyun Lee, Seoul; Bong-hun Song, Suwon, both of Rep. of Korea

[73] Assignee: Samsung Electronics Co., Ltd., Kyungki-do, Rep. of Korea

[21] Appl. No.: 923,416

[22] Filed: Sep. 4, 1997

Related U.S. Application Data

[63] Continuation of Ser. No. 474,655, Jun. 7, 1995, abandoned.

[30] Foreign Application Priority Data

Jun. 22, 1994 [KR] Rep. of Korea ................ 94-14323

[51] Int. Cl.$^6$ .................................................. G11B 5/09
[52] U.S. Cl. ........................................... 369/48; 369/32
[58] Field of Search ............................ 369/32, 30, 47, 369/48, 54, 58, 49, 50, 275.3, 60, 93

[56] References Cited

U.S. PATENT DOCUMENTS 5,546,368  8/1996  Lee et al. ........................... 369/47

Primary Examiner—Paul W. Huber
Attorney, Agent, or Firm—Sughrue, Mion, Zinn, Macpeak & Seas, PLLC

[57] ABSTRACT

A recording medium stores font data for song lyrics together with accompaniment information. The recording medium includes a first area in which lyrics information encoded with an index code is recorded, and a second area in which a font data look-up table, including an index code and font data corresponding to the lyrics information written in the first area, is recorded. A video-song accompaniment apparatus adopting the recording medium and method for reproducing the information stored on the recording medium requires less memory capacity to store the font data.

20 Claims, 4 Drawing Sheets

FIG. 4A

Love me tender

Love me true

Never let me go

FIG. 4B

LovemtndruNlg

FIG. 4C

| INDEX CODE | 00 | 01 | 02 | 03 | 04 | 05 | 06 | 07 | 08 | 09 | 0A | 0B | 0C |
|---|---|---|---|---|---|---|---|---|---|---|---|---|---|
| FONT DATA | L | N | d | e | g | l | m | n | o | r | t | u | v |

FIG. 4D

```
00 08 0C 03 06 03 0A 03
07 02 03 09 00 08 0C 03      LYRIC DATA ENCODED
06 03 0A 08 06 03 01 03      USING INDEX CODE
0C 03 09 05 03 0A 06 03
05 08
```

```
00 L  01 N  02 d  03 e
04 g  05 l  06 m  07 n       FONT DATA
08 o  09 r  0A t  0B u       LOOK-UP TABLE
0C v
```

SONG RECORDING MEDIUM FOR VIDEO-SONG ACCOMPANIMENT AND A RECORDING AND REPRODUCING METHOD AND REPRODUCING APPARATUS ADOPTING THE SAME

This is a Continuation of application Ser. No. 08/474,655 filed Jun. 7, 1995, now abandoned.

BACKGROUND OF THE INVENTION

The present invention relates to a video-song accompaniment apparatus, and more particularly to a recording medium for storing a font for song lyrics together with accompaniment information, and a recording and reproducing method and reproducing apparatus adopting the same.

A video-song accompaniment apparatus, commonly called a karaoke system, displays song lyrics on an image output device according to an accompaniment signal such as an audio music signal. Such a device allows a user to enjoy singing in time with the accompaniment while viewing the displayed song lyrics.

A conventional video-song accompaniment apparatus utilizes read-only memory (ROM) devices for storing font data corresponding to various kinds of characters. Here, however, large capacity memories are required to store song lyrics expressed in a language having numerous characters, such as Chinese which has about 20,000 characters, leading to higher costs.

A code system for the Korean language, for example, includes 2,350 expressible characters (Korean Coding Standard Proposal KS5601), and a code system for the English language includes 255 expressible characters (Extended ASCII Code). If the font size needed to express each character is 48×48 bits, 288 bytes per character are required. Therefore, about 0.7 mega-byte (MB) of memory is needed for representing all the characters of the above Korean KS5601 system, in which case, a 1 MB ROM is sufficient. However, the Chinese language requires 5.6 MB of memory (288 bytes×20,000 characters), and accordingly, an 8 MB ROM is needed. This represents a significant cost increase in the final product.

SUMMARY OF THE INVENTION

It is an object of the present invention to provide a recording medium from which lyric information can be reproduced without using a font ROM.

It is another object of the present invention to provide a recording and reproducing method which is appropriate for the above recording medium.

It is still another object of the present invention to provide a video-song accompaniment apparatus using the above recording medium.

To achieve the first object, a recording medium according to the present invention comprises: a first area in which lyrics information encoded using an index code is recorded; and a second area in which a font data look-up table which includes font data and the index code corresponding to the lyrics information written in a first area, is recorded.

To achieve the second object, a recording method according to the present invention comprises the steps of: finding a prime factor set of characters included in song lyrics; getting a classified characters set by classifying the characters included in the prime factor set according to the predetermined key and allocating an index code to each character composing the classified character set; getting a font data set having an one-to-one correspondence to the classified characters set; substituting the index code for the song lyrics; recording, in a first area, the index code which is substituted for the song lyrics; and recording, in a second area, the font data look-up table which includes the index code and the font data corresponding to the lyrics information.

Also in order to achieve the second object, a reproducing method according to the present invention, by which lyric information is reproduced from the recording medium having a first area in which the lyrics information encoded using an index code is recorded and a second area in which the font data look-up table corresponding to the lyrics information written on a first area is recorded, comprises the steps of: reading out the font data look-up table written on a second area, and storing the table on a font look-up table memory; and reading out the encoded lyrics information using the index code written on a first area and substituting font data corresponding to the lyrics information, for the lyrics information, referring to the memory.

To achieve the third object, a video song accompaniment apparatus according to the present invention, wherein the lyrics information is reproduced from the recording medium having a first area on which the lyrics information encoded using an index code, is recorded and a second area on which the font data look-up table corresponding to the lyrics information written on a first area is recorded, comprises: a font data look-up table memory on which the font data look-up table read out from a second area is stored; a lyrics information memory on which the encoded lyrics information using the lyrics information read out from a first area is stored; and a frame memory for reading out the lyrics information written on the lyrics information memory, reading out also the font data written on the font data look-up table memory having the index code corresponding to the lyrics information, then storing the font data, periodically scanning the stored contents on the frame memory, and outputting the contents as an image signal.

BRIEF DESCRIPTION OF THE DRAWINGS

The above objects and advantages of the present invention will become more apparent by describing in detail a preferred embodiment thereof with reference to the attached drawings in which:

FIG. 4A is a view illustrating partial lyrics of a song;

FIG. 4B is a view illustrating a prime factor set of the characters shown in FIG. 4A;

FIG. 4C is a view illustrating the result of allocating an index code by sorting the prime factor set of FIG. 4B;

FIG. 4D is a view illustrating a font data look-up table; and

DETAILED DESCRIPTION OF THE INVENTION

Figure 1:
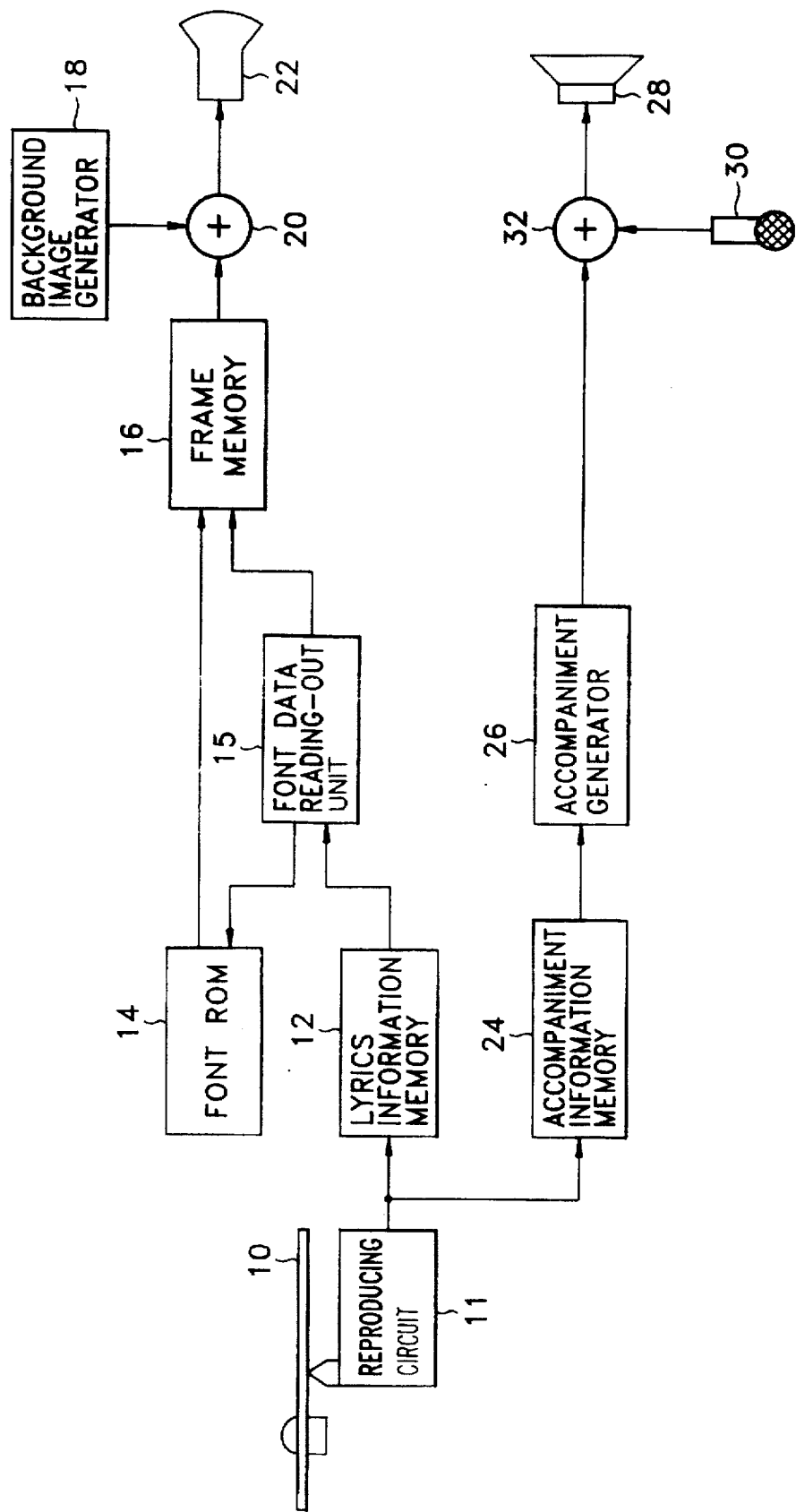
FIG. 1 is a block diagram illustrating a conventional video-song accompaniment apparatus.

FIG. 1 is a block diagram showing the construction of a conventional video-song accompaniment apparatus. In FIG.

1, disk recording medium 10 has a first area in which encoded text information, which can be song lyrics, is written and a second area in which a lyric signal is written. A lyric information memory 12 stores the encoded lyric information, read out from disk recording medium 10 by reproducing circuit 11. A font ROM 14 has stored font data for the character set of a code system to which the encoded lyrics information belongs. Font data reading-out unit 15 reads out, from font ROM 14, font data corresponding to the lyric information stored in lyric information memory 12. A frame memory 16 stores font data corresponding to the encoded lyric information stored in lyric information memory 12. A background image generator 18 generates a background image for the lyric information, and video mixer 20 mixes the outputs of background image generator 18 and frame memory 16, and provides the mixed signal to a video output device 22. Further, an accompaniment information memory 24 stores accompaniment information which is also reproduced by reproducing circuit 11. An accompaniment generator 26 reads out accompaniment information from accompaniment information memory 24, and reproduces an accompaniment signal corresponding to the accompaniment information. An audio mixer 32 mixes a vocal signal input through microphone 30 and the accompaniment signal generated by accompaniment generator 26.

In the prior art system shown in FIG. 1, lyric information, as encoded information according to the determined code system, is written on disk recording medium 10, and font data corresponding to the entire character set of the code system is written in font ROM 14. The contents of frame memory 16 are periodically read out in synchronization with a video signal generated from background image generator 18. Frame memory 16 stores font data representing lyric information. Address information and a character code are included in the lyric information read out from disk recording medium 10. The character code for a particular character of a lyric is provided to font ROM 14, and font data reading-out unit 15 outputs to frame memory 16 the font data corresponding to the character code. Frame memory 16 receives the address information and the font data, and locates the font data at the designated place according to the address information. Usually a font ROM 14, which includes a look-up table, outputs the font data as a bitmap pattern corresponding to the applied character code by using the applied character code as an address.

Hence, font ROM 14 must store the font data for all character sets following the code system, which results in a problem of increasing the cost burden due to the large capacity of a font ROM required in the case of a language having numerous characters, as mentioned above.

Figure 2:
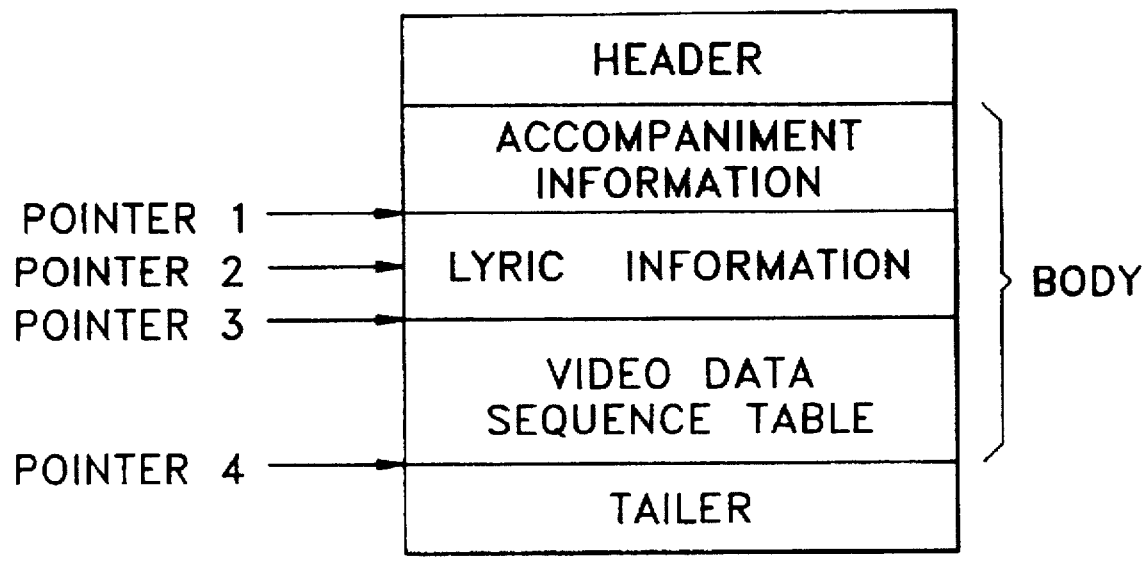
FIG. 2 is a view illustrating the data format of a song program of a recording medium according to the present invention.

FIG. 2 is a diagram showing the data format for recording a song program on a recording medium according to the present invention. The recording medium includes a lyric information area in which is recorded the lyric information encoded using an index code and a font data look-up table, which is comprised of the index code and the font data corresponding to the lyric information. As shown in FIG. 2, a header of a song program includes a header discrimination code, as well as information about the header size, program body size, and a pointer address, and the total program size. A program body comprises MIDI data for an accompaniment, lyric data encoded using an index code, a font data look-up table, and a video data sequence table. Pointers 1, 2, 3 and 4 indicate the starting addresses of the lyric data encoded using the index code, of the font data look-up table, of a video sequence table, and of a tailer, respectively.

Figure 3:
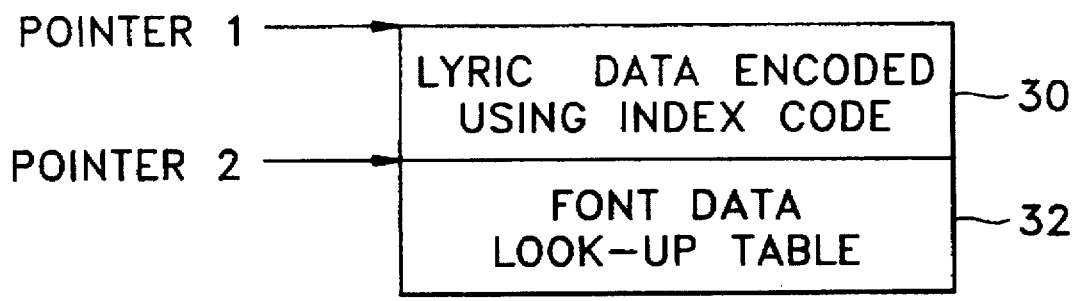
FIG. 3 is a detailed view illustrating a lyric area as shown in FIG. 2.

FIG. 3 shows in detail the lyric information area shown in FIG. 2. FIG. 3 shows a first area in which lyric information encoded using an index code 30 is recorded, and a second area in which the font data look-up table 32, corresponding to the lyric information written in the first area, is recorded. From here, the recording of "lyrics information encoded using an index code 30" in the first area and "a font data look-up table corresponding to the lyrics information 32" in the second area is explained with reference to FIGS. 4A through 4D.

FIGS. 4A through 4D show an example of recording the lyrics of a part of a popular song, in which the recording process is performed as follows.

First, a prime factor set of the characters included in the song lyrics is obtained (FIG. 4B). A prime factor set is simply a set consisting of a first instance of a character contained in the lyrics. In other words, the prime factor set contains only one instance of each character that appears in the lyrics.

Second, the characters included in the prime factor set are classified according to a predetermined code system, typically a KS5601 code system or a ASCII code system, in order to obtain a classified character set. Then an index code is allocated to each character within the classified character set (FIG. 4C).

Third, a font data set having a one-to-one correspondence to the classified character set is retrieved (FIG. 4C).

Fourth, the index code is substituted for the characters of the song lyrics, and hence, lyric information encoded using the index code is obtained.

Fifth, the encoded song lyric is recorded in the first area, lyric information encoded using index code 30, as shown in FIG. 3 (FIG. 4D).

Finally, a font data look-up table which includes the lyric information and corresponding font data for the prime factor set is recorded in the second area, i.e., the font data lookup table 32, as show in FIG. 3 (FIG. 4D).

In FIG. 4D, a total of 34 characters are written in the first area 30, however, the number of data constituting the font data look-up table written in the second area 32 is only 13. This reduced number of stored data results from the process of eliminating the duplicate characters in the lyric information. Usually, the number of font data needed to be stored for a single song is about 80, so that the number of bytes per song allocated to the recording medium in order to write the font data is 23.04 KB (288 bytes×80).

Figure 5:
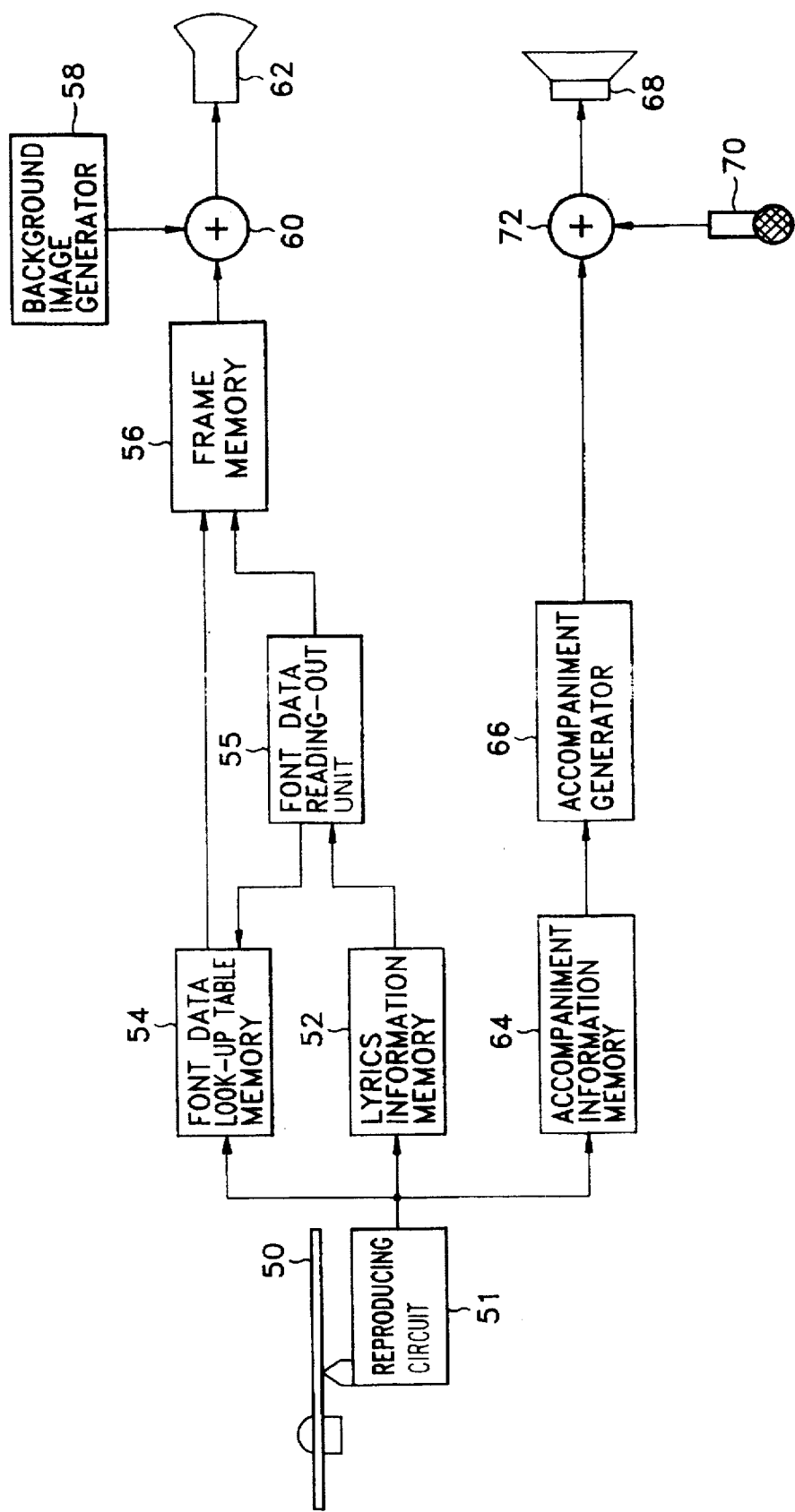
FIG. 5 is a block diagram illustrating a video-song accompaniment apparatus according to the present invention.

In FIG. 4D, the font data look-up table contains both font data and a corresponding index codes. But if the index code can be stored in its particular sequence (e.g., 00–0C), only the font data need be stored. For example, this can be achieved by allocating an index code according to the sequence in which font data is read out of the font data look-up table 32 shown in FIG. 3, when font data is stored in a font data look-up table memory 54 as shown in FIG. 5.

A method of reproducing lyric information written on a recording medium by the above-described method, and font data corresponding to the information, operates as follows.

First, the font data look-up table 32 shown in FIG. 3 is read out from the recording medium and stored in a font data look-up table memory.

Second, the lyric information encoded using an index code 30 shown in FIG. 3 is read out from the recording medium, and font data is substituted for the lyric information by referring to the font data look-up table memory.

FIG. 5 is a block diagram illustrating a reproducing apparatus for reproducing the recorded lyric information from a recording medium as shown in FIG. 2. In FIG. 5, a disk recording medium 50 has encoded lyric information using an index code written in first area 30, as shown in FIG. 3, and font data corresponding to the lyric information written in the first area and the corresponding index code are written in second area 32, as shown in FIG. 3. The encoded lyric information using the index code, which is read out from disk recording medium 50 by the reproducing apparatus, is stored in a lyric information memory 52. A font data look-up table reproduced from disk recording medium 50 is stored in a font data look-up table memory 54. A font data reading-out unit 55 reads out, from font data look-up table memory 54, the font data corresponding to the lyric information stored on lyric information memory 52. A frame memory 56 stores font data corresponding to the encoded lyric information using an index code stored in lyric information memory 52. A background image generator 58 generates a background image corresponding to the lyrics information. A video mixer 60 mixes the outputs of background image generator 58 and frame memory 56, and provides the result to a video output device 62.

Further, an accompaniment information memory 64 stores accompaniment information, reproduced from recording medium 50 by reproducing circuit 51. An accompaniment generator 66 reads out the accompaniment information from accompaniment information memory 64, and reproduces an accompaniment signal corresponding thereto. An audio mixer 72 mixes a vocal signal input through a microphone 70 with the accompaniment signal generated from accompaniment generator 66, and outputs the mixed signal to speaker 68.

Lyric information is written in the first area of disk recording medium 50 as encoded information using an index code as explained above in relation to FIGS. 2, 3 and 4A-4D. Font data look-up table corresponding to the lyric information is written in the second area in FIG. 3. However, unlike font ROM 14 in the video-song accompaniment apparatus of FIG. 1, no data is stored on font data look-up table memory 54 until a font data look-up table is read out from disk recording medium 50 and loaded in the memory.

The contents stored on frame memory 56 are read out periodically in synchronization with the video signal output from background image generator. Frame memory 56 stores font data representing the lyric information. The lyric information read out from disk recording medium 50, includes address information and an index code. From them, the index code is provided for font data look-up table memory 54, and the font data look-up table memory outputs to frame memory 56 the font data corresponding to the code. Frame memory 56 receives the address information and the font data, and locates the data at the designated position based on the address information.

Font data look-up table memory 54 stores the font data look-up table read out from the second area of disk recording medium 50.

Ordinarily, the number of font data needed for a single song is about 80. Hence, the memory capacity of font data look-up table memory 54 of FIG. 5 need only be 23.04 KB, which is much smaller than the 1 MB to 8 MB of memory needed for font ROM 14 of FIG. 1.

As described above, a recording medium according to the present invention has the effect of curtailing product cost by sharply reducing the memory capacity needed to store font data in a video-song accompaniment apparatus.

Also, since no ROM is needed to store font data, a recording medium according to the present invention has the effect of reducing the need for product repairs.

What is claimed is:

1. A recording medium for a reproducing apparatus, on which text information is recorded, comprising:

a first area in which text information encoded with index codes is recorded; and a second area in which a font data look-up table including index codes and font data corresponding to the text information recorded in the first area is recorded, wherein only font data for each character in a prime factor set for characters in the text information of said first area, is recorded in said second area.

2. A recording medium for a reproducing apparatus as set forth in claim 1, wherein said recording medium is an optical disk.

3. A recording medium for a reproducing apparatus as set forth in claim 1, wherein said recording medium is a semiconductor memory device.

4. A recording medium for a reproducing apparatus as set forth in claim 1, wherein the reproducing apparatus is a video-song accompaniment apparatus.

5. A recording medium for a reproducing apparatus as set forth in claim 1, wherein said text information corresponds to a song lyric information.

6. A recording medium for a reproducing apparatus as set forth in claim 1, wherein said text information is an encoded character and said font data corresponds to an expression of the character.

7. A recording medium for a reproducing apparatus as set forth in claim 6, wherein said font data has a size of approximately 288 bytes.

8. A reproducing apparatus, wherein text information is reproduced from a recording medium having a first area in which the text information which is encoded using an index code is recorded, and a second area in which a font data look-up table corresponding to the text information recorded in said first area is recorded, said apparatus comprising:

a font data look-up table memory for storing the font data look-up table, wherein the font data look-up table is read out from said second area of the recording medium;

a text information memory for storing the text information encoded using an index code, wherein said text information read out from said first area of the recording medium; and a frame memory for reading out said text information written in said text information memory, reading out the font data written in said font data look-up table memory having index codes corresponding to said text information, storing the font data therein, and outputting the contents of said memory as an image signal by periodically scanning the stored contents, wherein said font data stored in said font data look-up table memory includes font data only for characters in a prime factor set of characters of said text information read out from said first area of the recording medium.

9. A reproducing apparatus as set forth in claim 8, wherein the reproducing apparatus is a video-song accompaniment apparatus.

10. A reproducing apparatus as set forth in claim 8, wherein said text information corresponds to a song lyric information.

11. A reproducing apparatus as set forth in claim 8, wherein the text information is an encoded character and the font data corresponds to an expression of the character.

12. A reproducing apparatus as set forth in claim 11, wherein the font data has a size of approximately 288 bytes.

13. A method of reproducing a recording medium for a reproducing apparatus, by which text information is reproduced from said recording medium having a first area on which the text information encoded using an index code, is recorded, and a second area on which a font data look-up table corresponding to the text information written on said first area, is recorded, comprising the steps of:

reading out the font data look-up table recorded on said second area and storing the table on a font data look-up table memory; and reading out said text information encoded using the index code written on said first area, referring to said memory, and substituting font data corresponding to the text information, wherein said font data look-up table includes font data only for a prime factor set of characters of said text information.

14. A method of reproducing as set forth in claim 13, wherein the reproducing apparatus is a video-song accompaniment apparatus.

15. A method of reproducing as set forth in claim 13, wherein said text information corresponds to lyric information of a song.

16. A method of reproducing as set forth in claim 13, wherein said text information is an encoded character and said font data corresponds to an expression of the character.

17. A method of reproducing as set forth in claim 16, wherein said font data has a size of approximately 288 bytes.

18. A method of recording on a recording medium for a reproducing apparatus, in which text information and a font data look-up table are recorded on said recording medium having a first area in which text information encoded using index codes is recorded, and a second area in which the font data look-up table including the index codes and font data corresponding to the text information recorded in said first area, is recorded, said method comprising the steps of:

determining a prime factor set of characters included in the text information;

generating a classified characters set by classifying the characters included in the prime factor set according to the predetermined key and setting an index code for each character of the classified character set;

generating a font data set having an one-to-one correspondence to the characters of the classified characters set;

substituting for each character of the text information the corresponding index code;

recording in the first area of the recording medium the index code substituted for each character of the text information; and recording in a second area the font data look-up table.

19. A method of recording as set forth in claim 18, wherein the reproducing apparatus is a video-song accompaniment apparatus.

20. A method of recording as set forth in claim 18, wherein said text information corresponds to a song lyric information.

* * * * *